United States Patent [19]

Cho et al.

[11] Patent Number: 5,633,685
[45] Date of Patent: May 27, 1997

[54] METHOD AND APPARATUS FOR ENCODING AN IMAGE SIGNAL HAVING AN OBJECT BY USING AN EXTENSION-INTERPOLATION TECHNIQUE

[75] Inventors: Soon-Jae Cho; Jae-Gark Choi; Si-Woong Lee; Yi-Han Kim; Seong-Dae Kim, all of Daejeon; Hae-Mook Jung, Seoul, all of Rep. of Korea

[73] Assignee: Daewoo Electronics Co., Ltd., Seoul, Rep. of Korea

[21] Appl. No.: 629,173

[22] Filed: Apr. 8, 1996

[30] Foreign Application Priority Data

Apr. 8, 1995 [KR] Rep. of Korea .................. 95-8178

[51] Int. Cl.$^6$ .................. H04N 7/30; G06K 9/00
[52] U.S. Cl. .................. 348/420; 382/242
[58] Field of Search .................. 348/420, 390, 348/384, 403, 404, 699; 382/283, 257, 256, 242, 243

[56] References Cited

U.S. PATENT DOCUMENTS

5,105,472  4/1992  Murayama .................. 382/242
5,333,213  7/1994  Koyama et al. .................. 382/283

*Primary Examiner*—Amelia Au
*Attorney, Agent, or Firm*—Pennie & Edmonds

[57] ABSTRACT

A processing block is processed by using an extension-interpolation ("E-I") method, wherein the processing block consisting of N×N pixels which are classified into object pixels and background pixels and the E-I method comprises the steps of: (A) selecting L rows of the processing block, each having at least one object pixels; (B) for each selected row, determining M representing a number of object pixels included in said each selected row and providing a first vector representing the M object pixels; (C) for each first vector, selecting an extension matrix among a multiplicity of predetermined extension matrices based on the M and N values and multiplying the selected extension matrix to the first vector to provide an extended first vector; (D) providing a first extended processing block which includes L rows, each row representing each of the extended first vectors; (E) for each column of the first extended processing block, providing a corresponding L-dimensional second vector; (F) selecting an extension matrix among a multiplicity of the predetermined extension matrices based on the L and N values; and (G) multiplying the extension matrix selected at step (F) to each of the second vectors, to provide N extended second vectors.

7 Claims, 6 Drawing Sheets

LINEAR INTERPOLATION

METHOD AND APPARATUS FOR ENCODING AN IMAGE SIGNAL HAVING AN OBJECT BY USING AN EXTENSION-INTERPOLATION TECHNIQUE

FIELD OF THE INVENTION

The present invention relates to a method and an apparatus for encoding an image signal at a low bit-rate; and, more particularly, to a method and an apparatus for encoding an image signal having an object through the use of an extension-interpolation ("E-I") technique.

DESCRIPTION OF THE PRIOR ART

In various electronic applications such as high definition TV and video telephone systems, a video signal may be transmitted in a digital form. When the video signal comprising a sequence of video "frames" is expressed in a digital form, there occurs a substantial amount of digital data: for each line of a video frame is defined by a sequence of digital data elements referred to as "pixels". Since, however, the available frequency bandwidth of a conventional transmission channel is limited, in order to transmit the substantial amount of digital data through the fixed channel, a video signal encoding method is normally used to compress the digital data.

One of such methods for encoding image signals for a low bit-rate encoding system is the so-called object-oriented analysis-synthesis coding technique (see Michael Hötter, "Object-Oriented Analysis-Synthesis Coding Based on Moving Two-Dimensional Objects", *Signal Processing: Image Communication*, 2, 409–428(1990)).

According to the object-oriented analysis-synthesis coding technique, an input image signal, which has moving objects, is divided into the objects; and three sets of parameters for defining motion, contour and pixel data of each object are processed through different encoding channels.

In case of processing image data or pixels lying within an object, a transform coding technique for reducing the spatial redundancies contained in the image data may be mainly employed in the object-oriented analysis-synthesis coding technique. One of the most frequently used transform coding techniques for image data compression is a DCT (discrete cosine transform) based block transformation coding, which converts a block of digital image data, for example, a block of 8×8 pixels, into a set of transform coefficient data. This method is described in, e.g., Chen and Pratt, "Scene Adaptive Coder", *IEEE Transactions on Communications*, COM-32, No. 3, pp. 225–232 (March 1984).

Figure 1A:
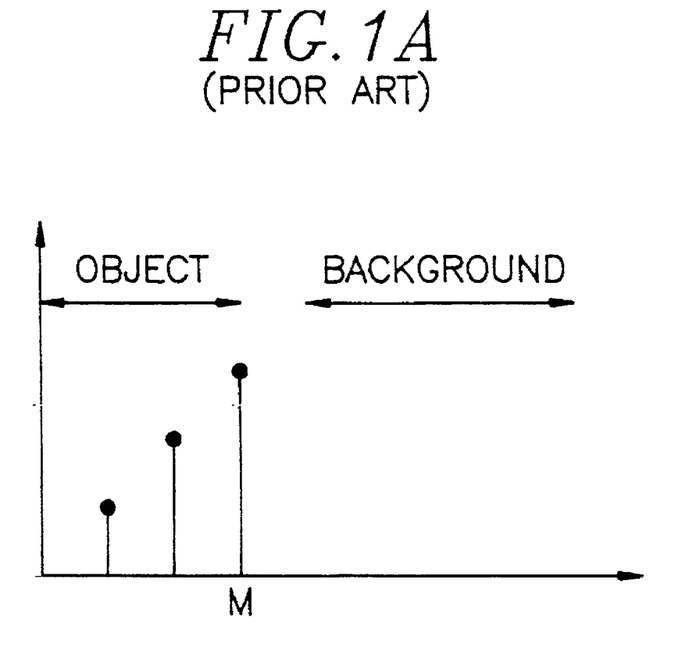
FIGS. 1A to 1D represent different methods for filling a background region.
Figure 1B:
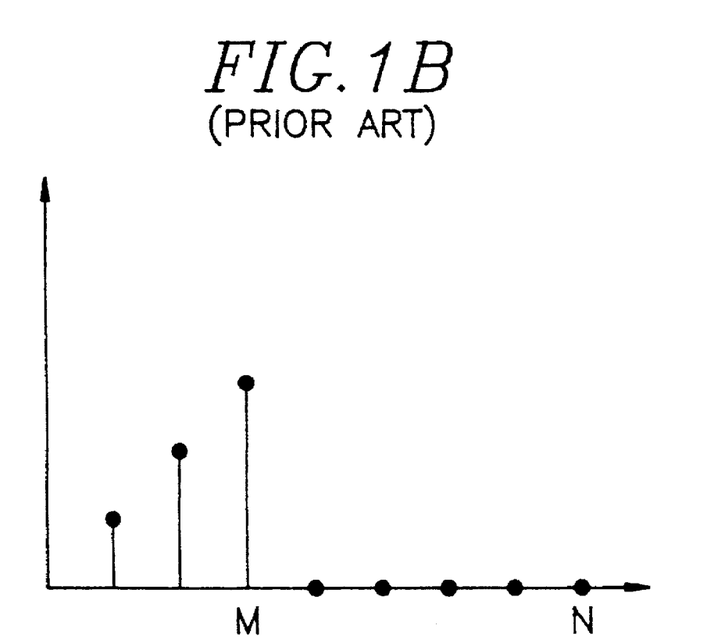
Figure 1C:
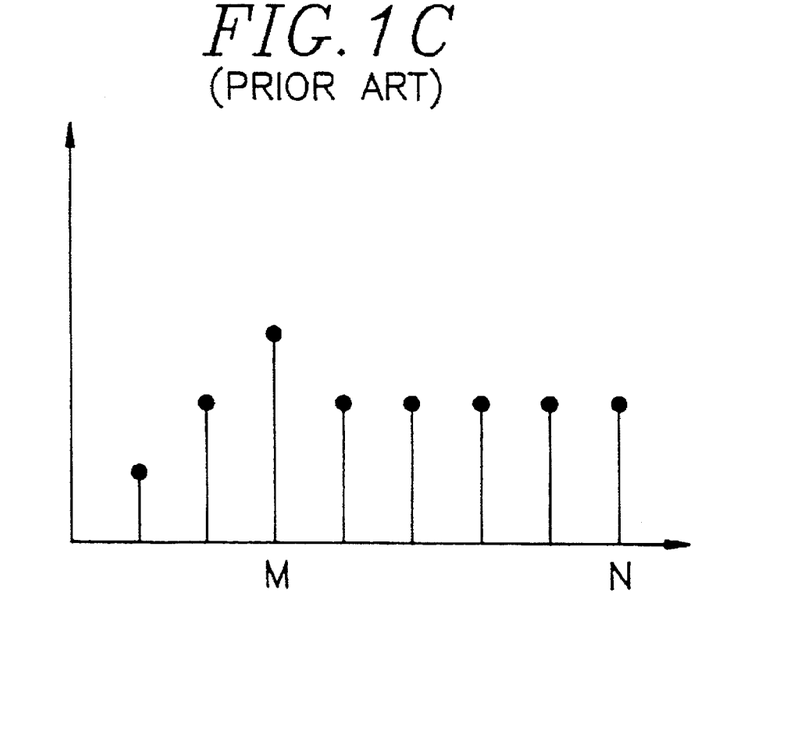
Figure 1D:
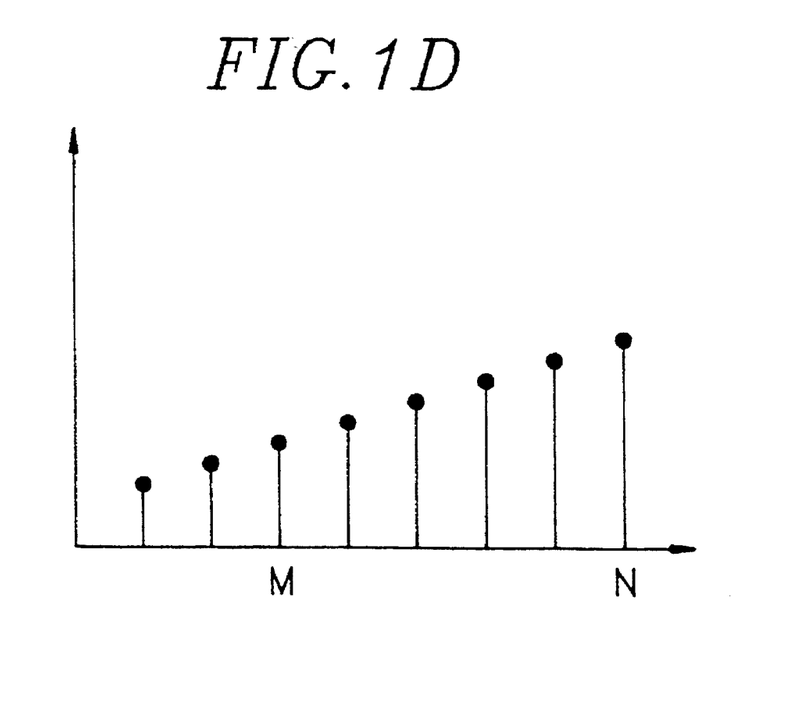

In the DCT based block transformation coding, a background or non-object region within a block is filled with, e.g., 0, average pixel value or a mirror image of an object region in the block, and then transformation is carried out. Referring to FIGS. 1B and 1C, conventional methods for filling the background region are illustrated for a 1-dimensional case. Specifically, in FIG. 1B, the background region is filled with 0; and in FIG. 1C, the background region is filled with an average pixel value in the object region.

Even though these methods have the advantage of being able to utilize two-dimensional DCT blocks used in conventional methods (such as Joint Photographic Experts Group: JPEG, Moving Pictures Experts Group: MPEG, H.261 etc.), it also includes unnecessary or undesired data in the background region of the image, and is, therefore, inefficient from a data compression point of view.

SUMMARY OF THE INVENTION

It is, therefore, a primary object of the present invention to provide a method for effectively encoding an image frame signal having an object using an extension-interpolation technique, thereby improving the data compression efficiency thereof.

It is another object of the present invention to provide an image encoding device which encodes the image frame signal having an object by using a block-based transformation and the extension-interpolation techniques.

In accordance with one aspect of the present invention, there is provided a method for converting a processing block included in an image frame signal having an object to an extended processing block, wherein the processing block consists of N×N pixels which are classified into object pixels and background pixels, N being a positive integer, the object pixels being located within the object and the background pixels being located outside the object, comprising the steps of:

(A) deciding either a horizontal or a vertical extension which has a priority based on a shape of the object pixels in the processing block;

(B) in case the horizontal extension has the priority, selecting a plurality of object rows, each of the object rows being a row of the processing block having at least one object pixels, and for each of the object rows, providing a first vector, each element of the first vector being a value of each object pixel included in said each object row, and in case the vertical extension has the priority, selecting a plurality of object columns, each of the object columns being a column of the processing block having at least one object pixels, and for each of the object columns, providing a first vector, each element of the first vector being a value of each object pixel included in said each object column, to thereby provide L first vectors, L being an integer ranging from 0 to N and denoting a number of object rows or object columns;

(C) for each of the first vectors, selecting an extension matrix among a multiplicity of predetermined extension matrices, based on a number of elements in said each first vector and N, and multiplying the selected extension matrix to said each first vector, to thereby provide L extended first vectors, each of the L extended first vectors having N elements;

(D) in case the horizontal extension has the priority, providing a first extended processing block including L rows, each row having N pixels whose values are elements of each of the extended first vectors and, for each column of the first extended processing block, providing an L-dimensional second vector, elements of the second vector being values of pixels included in said each column of the first extended block, and in case the vertical extension has the priority, providing a first extended processing block including L columns, each column having N pixels whose values are elements of each of the extended first vectors and, for each row of the first extended processing block, providing an L-dimensional second vector, elements of the second vector being values of pixels included in said each row of the first extended block;

(E) selecting an extension matrix among a multiplicity of the predetermined extension matrices based on the L and N values; and (F) multiplying the extension matrix selected at step (E) to each of the second vectors, to thereby provide N extended second vectors, each of the N extended second vectors having N elements; and (G) in case the horizontal extension has the priority, providing the extended processing block including N columns, each column having N pixels whose values are elements of each of the extended second vectors, and in case the vertical extension has the priority, providing the extended processing block including N rows, each row having N pixels whose values are elements of each of the extended second vectors.

In accordance with another aspect of the present invention, there is provided an apparatus for encoding an image frame signal having an object, wherein the image frame signal consists of object pixels and background pixels, the object pixels being located within the object and the background pixels being located outside the object, which includes:

(A) means for detecting a boundary of the object included in the image frame to generate a contour signal providing boundary information for tracing the object boundary;

(B) means for encoding the contour signal to generate a first encoded image frame signal;

(C) means for dividing the image frame into a plurality of processing blocks, each of the processing blocks having N ×N pixels, N being a positive integer;

(D) means for generating a control signal indicating whether or not a part of the object boundary exists in each of the processing blocks;

(E) means for dividing the processing blocks to a first and a second sets of processing blocks in response to the control signal, wherein a part of the object boundary exists in each of the processing blocks of the first set;

(F) means for converting each of the first set of processing blocks to an extended processing block;

(G) means for encoding the extended processing blocks or the second set of processing blocks, to thereby produce a second encoded image frame signal; and (H) means for formatting the first and the second encoded image signals, wherein said means for converting comprises:

(F1) means for deciding either a horizontal or a vertical extension which has a priority based on a shape of the object pixels in each of the first set of processing blocks;

(F2) means, in case the horizontal extension has the priority, selecting a plurality of object rows, each of the object rows being a row of the processing block having at least one object pixels, and for each of the object rows, providing a first vector, each element of the first vector being a value of each of object pixel included in said each object row, and in case the vertical extension has the priority, selecting a plurality of object columns, each of the object columns being a column of the processing block having at least one object pixels, and for each of the object columns, providing a first vector, each element of the first vector being a value of each object pixel included in said each object column, to thereby provide L first vectors, L being an integer ranging from 0 to N and denoting a number of object rows or object columns;

(F3) means, for each first vector, for selecting an extension matrix among a multiplicity of predetermined extension matrices based on a number of element in said first vector and N, and multiplying the selected extension matrix to said each first vector, to thereby provide L extended first vectors, each of the L extended first vectors having N elements;

(F4) means, in case the horizontal extension has the priority, for providing a first extended processing block including L rows, each row having N pixels whose values are elements of each of the extended first vectors and, for each column of the first extended processing block, for providing an L-dimensional second vector, elements of the second vector being values of pixels included in said each column of the first extended block, and in case the vertical extension has the priority, for providing a first extended processing block including L columns, each column having N pixels whose values are elements of each of the extended first vectors and, for each row of the first extended processing block, for providing an L-dimensional second vector, elements of the second vector being values of pixels included in said each row of the first extended block;

(F5) means for choosing an extension matrix among a multiplicity of the predetermined extension matrices based on the L and N values;

(F6) means for multiplying the extension matrix chosen at means for choosing to each of the second vectors, to thereby provide N extended second vectors, each of the N extended second vectors having N elements; and (F7) means, in case the horizontal extension has the priority, for providing the extended processing block including N columns, each column having N pixels whose values are elements of each of the extended second vectors, and in case the vertical extension has the priority, for providing the extended processing block including N rows, each row having N pixels whose values are elements of each of the extended second vectors.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 2A:
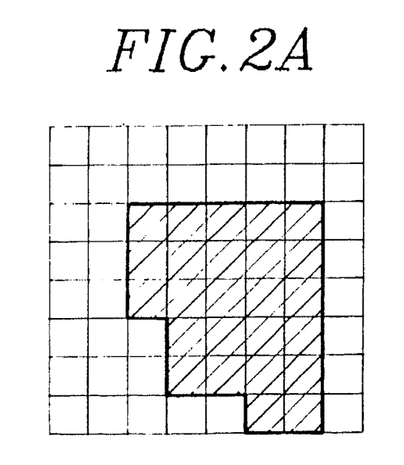
FIGS. 2A to 2C show the extension-interpolation technique in accordance with the present invention.
Figure 2B:
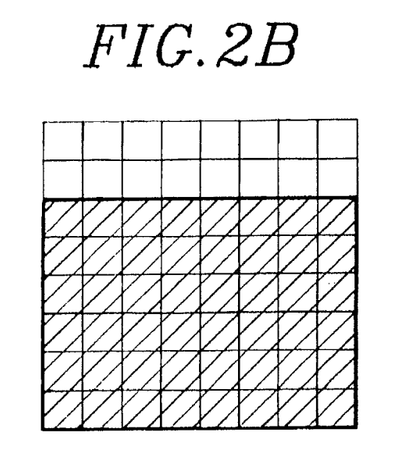
Figure 2C:
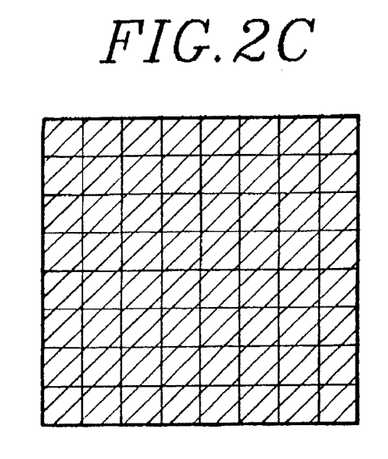

Referring to FIG. 2A, there is shown a block of digital image signal which includes 8×8 pixels, each of them being denoted by a square. The block contains an object region which is represented by shaded pixels and a remaining background region. The shaded pixels are called as object pixels while the other pixels are called as background pixels. The object pixels are extended to fill the entire block as shown in FIGS. 2B to 2C by using the extension-interpolation ("E-I") technique of the present invention. To achieve this, a horizontal and a vertical extensions are performed separately as shown in FIGS. 2B and 2C, respectively. Either the horizontal or the vertical extension is performed prior to the other and the priority may be decided according to image characteristics. The horizontal or the vertical extension may be performed row-by-row or column-by-column. In case that a block includes N×N pixels, for each row or each column, M-dimensional ("M-D") vector, M being an integer ranging from 1 to N, is converted to N-dimensional ("N-D") vector, wherein elements of the M-D vector are M object pixel values included in each row or each column, and elements of the N-D vector are N extended pixel values. For example, in case of the third row of the block shown in FIG. 2A, 5-dimensional vector is converted to 8-dimensional vector representing the third row of a horizontally extended block shown in FIG. 2B.

A transformed M-D vector $F_1$ obtained by applying M-point 1-dimensional ("1-D") DCT to the M-D vector $f_1$ are represented as follows:

$$\begin{pmatrix} F_1(0) \\ F_1(1) \\ \vdots \\ F_1(M-1) \end{pmatrix} = \begin{pmatrix} b_{00} & b_{01} & \cdots & b_{0(M-1)} \\ b_{10} & b_{11} & \cdots & b_{1(M-1)} \\ \vdots & \vdots & \ddots & \vdots \\ b_{(M-1)0} & b_{(M-1)1} & \cdots & b_{(M-1)(M-1)} \end{pmatrix} \begin{pmatrix} f_1(0) \\ f_1(1) \\ \vdots \\ f_1(M-1) \end{pmatrix} \quad \text{Eq. (1)}$$

wherein $f_1(n_1)$ is $n_1$th element of $f_1$; $F_1(k_1)$ is $k_1$th element of $F_1$; $n_1$ and $k_1$ are integers ranging from 0 to M-1; and $b_{ij}$ is represented as:

$$\sqrt{\frac{1}{M}} \quad \text{for } i = 0$$

$$\sqrt{\frac{2}{M}} \cos\left[\frac{\pi(2j+1)i}{2M}\right] \quad \text{for } i \neq 0$$

Similarly, when the M-D vector $f_1$ is extended to form an N-D vector $f_2$ by using the E-I technique of the present invention, a transformed N-D vector $F_2$ obtained by applying N-point 1-D DCT to the N-D vector $f_2$ are represented as follows:

$$\begin{pmatrix} F_2(0) \\ F_2(1) \\ \vdots \\ F_2(M-1) \\ \vdots \\ F_2(N-1) \end{pmatrix} = \quad \text{Eq. (2)}$$

$$\begin{pmatrix} a_{00} & a_{01} & \cdots & a_{0(M-1)} & \cdots & a_{0(N-1)} \\ a_{10} & a_{11} & \cdots & a_{1(M-1)} & \cdots & a_{1(N-1)} \\ \vdots & \vdots & & \vdots & & \vdots \\ a_{(M-1)0} & a_{(M-1)1} & \cdots & a_{(M-1)(M-1)} & \cdots & a_{(M-1)(N-1)} \\ \vdots & \vdots & & \vdots & & \vdots \\ a_{(N-1)0} & a_{(N-1)1} & \cdots & a_{(N-1)(M-1)} & \cdots & a_{(N-1)(N-1)} \end{pmatrix} \begin{pmatrix} f_2(0) \\ f_2(1) \\ \vdots \\ f_2(M-1) \\ \vdots \\ f_2(N-1) \end{pmatrix}$$

wherein $f_2(n_2)$ is $n_2$th element of $f_2$; $F_2(k_2)$ is $k_2$th element of $F_2$; $n_2$ and $k_2$ are integers ranging from 0 to N-1; and $a_{ij}$ is represented as:

$$\sqrt{\frac{1}{N}} \quad \text{for } i = 0$$

$$\sqrt{\frac{2}{N}} \cos\left[\frac{\pi(2j+1)i}{2N}\right] \quad \text{for } i \neq 0.$$

Two methods for extending the M-D vector to the N-D vector will be described hereinafter: one is an optimal E-I method and the other is a linear interpolation method.

In accordance with the optimal E-I method, the M-D vector $f_1$ is extended to N-D vector $f_2$ without generating any additional frequency domain data. That is, the following equation is satisfied, $$\begin{pmatrix} F_2(0) \\ F_2(1) \\ \vdots \\ F_2(M-1) \\ F_2(M) \\ \vdots \\ F_2(N-1) \end{pmatrix} = \begin{pmatrix} \mu_0 F_1(0) \\ F_1(1) \\ \vdots \\ F_1(M-1) \\ 0 \\ \vdots \\ 0 \end{pmatrix} \quad \text{Eq. (3)}$$

wherein $\mu_0$ is a scaling factor used to make the DC component of $f_2$ equal to that of $f_1$ and is given as, $$\mu_0 = \sqrt{\frac{N}{M}}$$

When Eq. (3) is satisfied, the E-I procedure is optimal because no additional data is generated in the frequency domain.

From Eqs. (1) and (2), it can be deduced that $f_2$ is obtained from $f_1$ as follows:

$$\begin{pmatrix} f_2(0) \\ f_2(1) \\ \vdots \\ f_2(M-1) \\ \vdots \\ f_2(N-1) \end{pmatrix} = \begin{pmatrix} a_{00} & a_{01} & \cdots & a_{0(M-1)} & \cdots & a_{0(N-1)} \\ a_{10} & a_{11} & \cdots & a_{1(M-1)} & \cdots & a_{1(N-1)} \\ \vdots & \vdots & & \vdots & & \vdots \\ a_{(M-1)0} & a_{(M-1)1} & \cdots & a_{(M-1)(M-1)} & \cdots & a_{(M-1)(N-1)} \\ \vdots & \vdots & & \vdots & & \vdots \\ a_{(N-1)0} & a_{(N-1)1} & \cdots & a_{(N-1)(M-1)} & \cdots & a_{(N-1)(N-1)} \end{pmatrix}^{-1}$$

$$\begin{pmatrix} \mu_0 b_{00} & \mu_0 b_{01} & \cdots & \mu_0 b_{0(M-1)} \\ b_{10} & b_{11} & \cdots & b_{1(M-1)} \\ \vdots & \vdots & & \vdots \\ b_{(M-1)0} & b_{(M-1)1} & \cdots & b_{(M-1)(M-1)} \\ 0 & 0 & \cdots & 0 \\ \vdots & \vdots & & \vdots \\ 0 & 0 & \cdots & 0 \end{pmatrix} \cdot \begin{pmatrix} f_1(0) \\ f_1(1) \\ \vdots \\ f_1(M-1) \end{pmatrix} \quad \text{Eq. (4A)}$$

or $$f_2 = A^{-1} B f_1 \quad \text{Eq. (4B)}$$

wherein A and B denote the N×N and the N×M matrices whose components are $a_{ij}$ and $b_{ij}$ used in Eq. (4A), respectively. Eqs. (4A) and (4B) are further simplified as follows:

$$\begin{pmatrix} f_2(0) \\ f_2(1) \\ \vdots \\ f_2(N-1) \end{pmatrix} = \begin{pmatrix} c_{00} & c_{01} & \cdots & c_{0(M-1)} \\ c_{10} & c_{11} & \cdots & c_{1(M-1)} \\ \vdots & \vdots & & \vdots \\ c_{(N-1)0} & c_{(N-1)1} & \cdots & c_{(N-1)(M-1)} \end{pmatrix} \cdot \begin{pmatrix} f_1(0) \\ f_1(1) \\ \vdots \\ f_1(M-1) \end{pmatrix} \quad \text{Eq. (5A)}$$

$$f_2 = C f_1 \quad \text{Eq. (5B)}$$

wherein C is an N×M matrix and equal to $A^{-1}B$.

By using the above relationship, an arbitrary shaped object is extended to fill an N×N block without generating additional frequency domain elements.

Conversely, the original data of FIG. 2A is recovered from the N×N block shown in FIG. 2C.

In case N is identical to M, C is an identity matrix. Therefore, the extension procedure dosen't change the original vector $f_1$ and can be ommitted.

Figure 3:
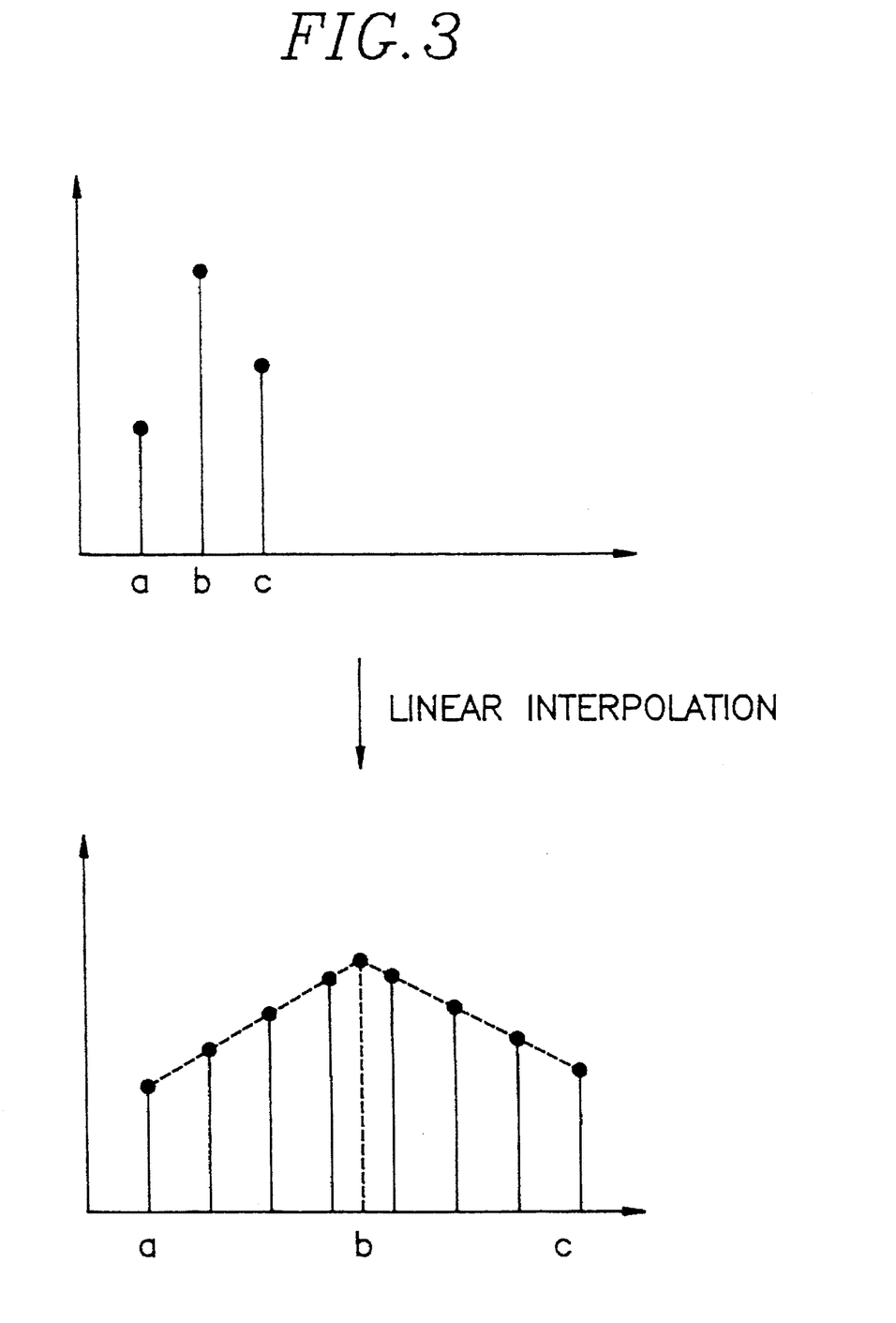
FIG. 3 illustrates a linear interpolation method.

Another method for extending M-D vector to N-D vector is a well-known linear interpolation method. Since a matrix multiplication is not involved in the extension procedure, the linear interpolation method is simpler in view of the computational complexity. Referring to FIG. 3, the linear interpolation method is illustrated in case that M and N is 3 and 8, respectively.

In the example depicted in FIGS. 2A to 2C, third to eighth rows of the block shown in FIG. 2A are first horizontally extended by using the optimal E-I or the linear interpolation methods to those of the block shown in FIG. 2B. Similarly, columns of the horizontally extended block shown in FIG. 2B are vertically extended by using the optimal E-I or the linear interpolation methods to those of the extended block shown in FIG. 2C.

Figure 4:
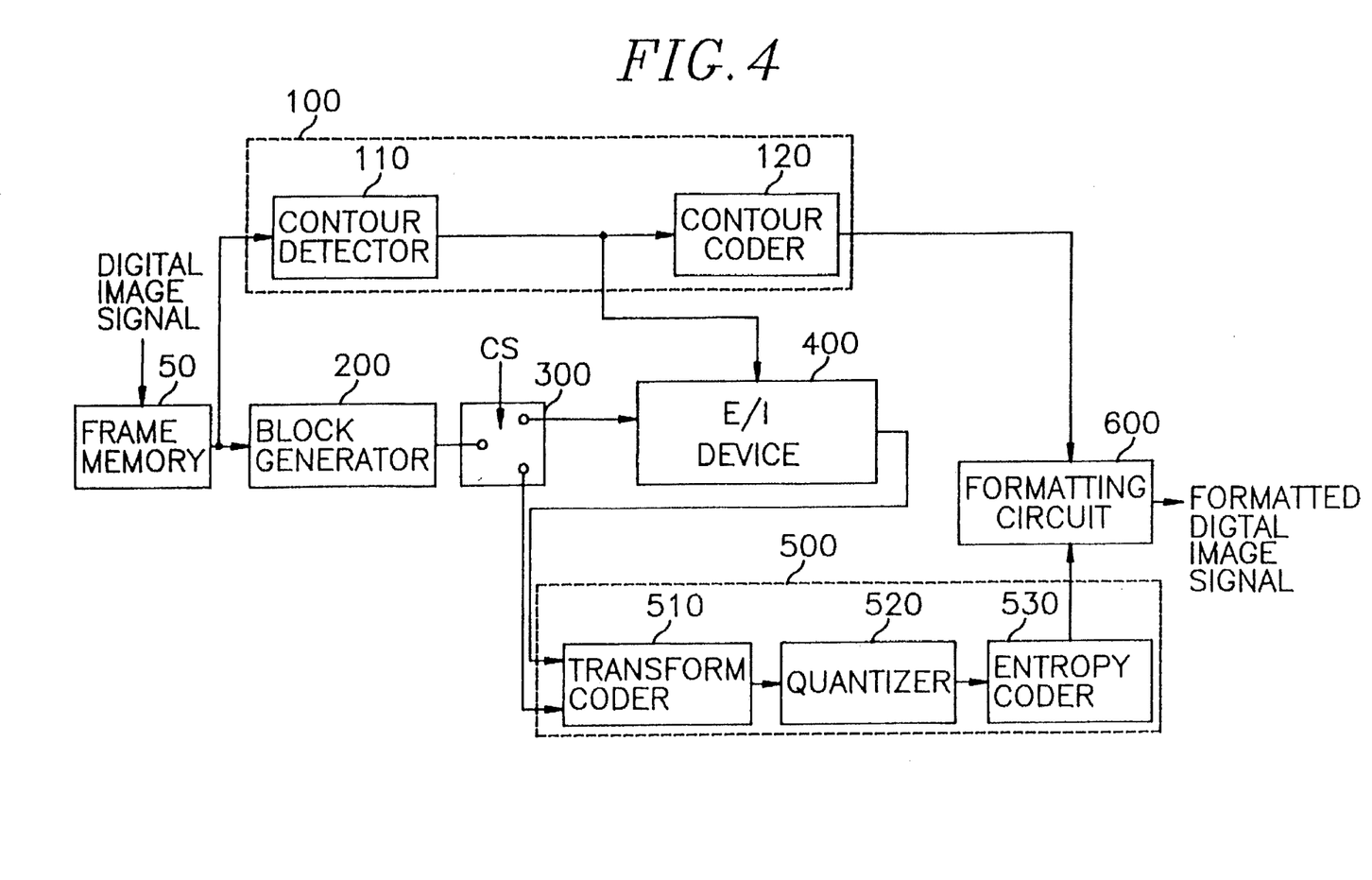
FIG. 4 provides a block diagram illustrating an image signal encoding apparatus in accordance with the present invention.

Referring to FIG. 4, there is shown a block diagram of an apparatus for encoding a digital image signal in accordance with the present invention. The encoding apparatus comprises a first and a second encoding channels 100 and 500, and an extension-interpolation device 400 for producing extended processing blocks in order to effectively encode a portion of a boundary of an object in the image signal, wherein the first encoding channel 100 serves to encode a contour signal of the object and the second encoding channel 500 operates to encode the digital image signal on a block-by-block basis.

The digital image signal, which is generated from a known image source(not shown), e.g., a hard disk or a compact disk, is inputted to a frame memory 50 for the storage thereof. A frame of the digital image signal has an object and includes object pixels which are located within the object and background pixels which are located outside thereof. The background pixels may be represented as pixels whose values are much larger or smaller than the range of the ordinary pixel value. An image frame signal from the frame memory 50 is then retrieved to a contour detector 110 in the first encoding channel 100 and a block generator 200.

The first encoding channel 100, which includes the contour detector 110 and a contour coder 120, serves to detect and encode the contour signal of the object in the image frame signal from the frame memory 50 by employing a known contour detecting and coding technique to produce an encoded contour signal. As well known in the art, the contour signal of the object can be derived from edge points defined as pixel locations at which a significant change occurs on a physical aspect of the image frame signal to form the object thereof. The contour signal detected at the contour detector 110 is then provided to the contour coder 120 for the encoding thereof.

At the contour coder 120, the contour signal from the contour detector 110 is encoded by using, e.g., a binary arithmetic code of JPEG (Joint Photographic Experts Group) and then the encoded contour signal is supplied to a formatting circuit 600.

In the meantime, the block generator 200 divides the image frame signal from the frame memory 50 into a multiplicity of processing blocks having an identical size of N×N pixels, N being a positive integer, and provides the processing blocks to a switching circuit 300 on a block-by-block basis. At the switching circuit 300, each of the processing blocks from the block generator 200 is selectively coupled to the E-I device 400 or the second encoding channel 500 in response to a control signal CS from a system controller (not shown). The system controller generates the control signal CS based on the contour information of the object in the image frame signal, the control signal, CS indicating whether or not a part of the object boundary in the image frame exists in each of the processing blocks. If the part of the object boundary exists in a processing block, i.e., the processing block has an object region and a background region simultaneously, the processing block is coupled to the E-I 400 for generating an extended processing block; otherwise, it is sent to the second encoding channel 500.

In accordance with the present invention, the E-I device 400 converts each of the processing blocks from the switching circuit 300 into the extended processing block for improving a data compression efficiency at the second encoding channel 500. Specifically, the processing block fed to the device 400 is similar to the one shown in FIG. 2A and converted therein to the extended processing block as explained with reference to FIGS. 2A to 2C.

The second encoding channel 500, which includes a transform coder 510, a quantizer 520 and an entropy coder 530, serves to encode the image data included in each of the extended processing blocks from E-I device 400 or a non-extended processing block from the switching circuit 300 by using a conventional transform and statistical coding technique. That is, the transform coder 510 transforms the image data of each processing block in the spatial domain from the E-I device 400 or the switching circuit 300 into a set of transform coefficients in the frequency domain by employing, e.g., a discrete cosine transform (DCT) and provides the set of the transform coefficients to the quantizer 520. At the quantizer 520, the set of the transform coefficients is quantized by using a known quantization method; and then the set of the quantized transform coefficients is fed to the entropy coder 530 for further processing.

The entropy coder 530 encodes the set of the quantized transform coefficients from the quantizer 520 for each of the non-extended or extended processing blocks by using, e.g., a combination of run-length and variable length coding to generate an encoded image frame signal. The image frame signal encoded by the entropy coder 530 is then provided to the formatting circuit 600.

The formatting circuit 600 formats the encoded contour signal from the contour coder 120 in the first encoding channel 100 and the encoded image frame signal from the entropy coder 530 in the second encoding channel 500, to thereby provide a formatted digital image signal to a transmitter (not shown) for the transmission thereof.

As demonstrated above, the present invention is capable of considerably reducing high frequency components present between the pixels within an object and those pixels outside thereof during the coding process using the optimal E-I or the linear interpolation methods, thereby improving the overall coding efficiency.

Figure 5:
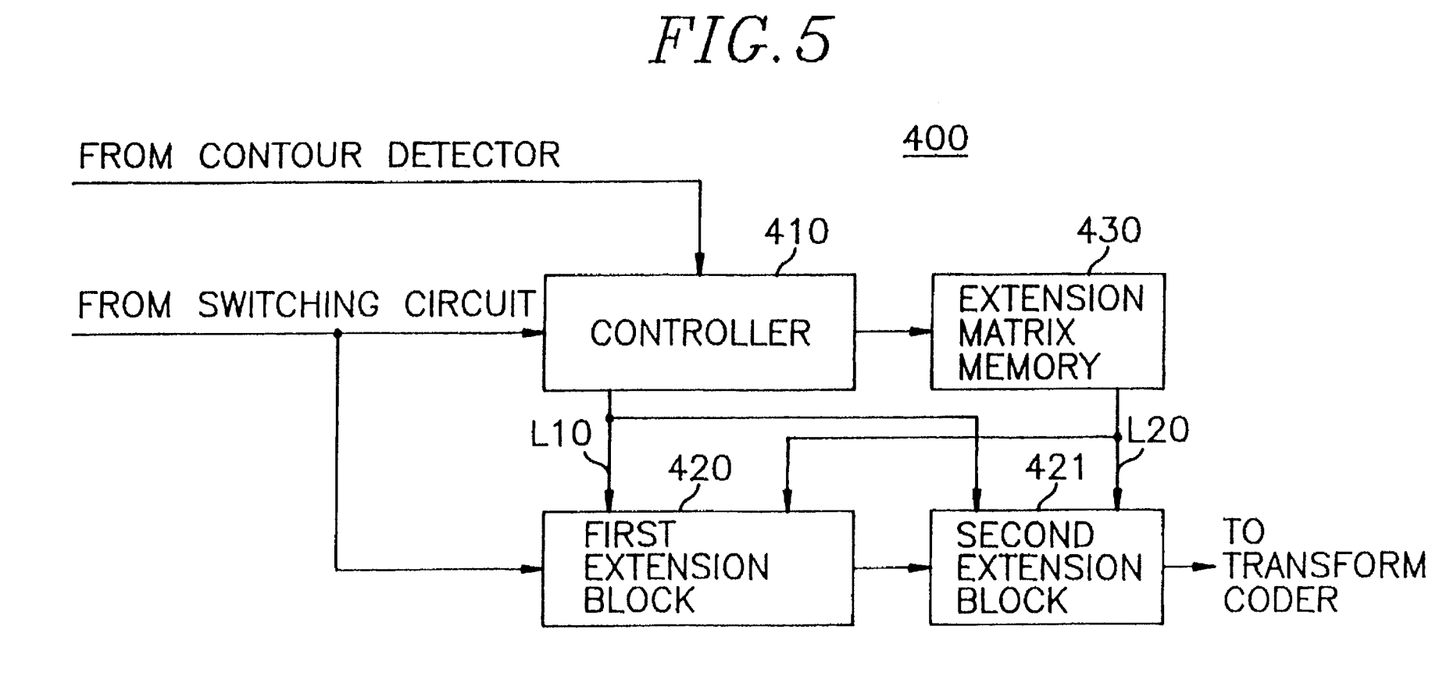
FIG. 5 offers a detailed block diagram of an extension-interpolation device shown in FIG. 4.

Referring to FIG. 5, there is shown a detailed block diagram of the E-I device 400 in accordance with the optimal extension-interpolation method, which includes a controller 410, a first and a second extension blocks 420 and 421, and an extension matrix memory 430. The processing block from the switching circuit 300 and the contour signal from the contour detector 110 are coupled to the controller 410 which generates control signals for controlling the other part of the E-I device 400. For example, the controller 410 may generate a H/V priority signal denoting either horizontal or vertical extension which is to be done prior to the other based on, e.g., shape of the object region in the processing block; an M-value signal representing the number of object pixels in a row or a column which is currently processed in the first or the second extension block 420 and 421; and/or an object pixel start signal identifying the position of the first object pixel in a row or a column which is currently processed in the first or the second extension block 420 and 421. The control signals generated at the controller 410 are coupled to the extension matrix memory 430, the first and the second extension block 420 and 421.

The extension matrix memory 430 stores extension matrices, i.e., C in Eq. (5B), for converting an M-D vector to an N-D vector. N is preset according to a system design and is 8 in many cases. Therefore, it is possible to precalculate the extension matrix C for all values of M, i.e., 1 to N and to store them at the extension matrix memory 430. The extension-interpolation for a row (or a column) of the processing block can be easily done by multiplying an appropriate extension matrix stored at the extension matrix memory 430 to the M-D vector formed with values of the object pixels in the row (or the column).

The processing block from the switching circuit 300 and the control signals from the controller 410 are fed to the first extension block 420. For the purpose of illustration, it will be assumed that the horizontal extension has the priority. At the first extension block 420, in response to the control signals from the controller 410, M-D vectors to be processed are selected. In case of the processing block shown in FIG. 2A, the third to seventh pixel values of the third row are selected first. An extension matrix for an M value of 5 is provided from the extension matrix memory 430 to the first extension block 420 in response to the M-value signal from the controller 410 and is multiplied to the 5-D vector representing the object pixels of the third row. The fourth to eighth rows of the processing block shown in FIG. 2A are processed in a similar manner.

After the horizontal extension is finished, the horizontally extended processing block similar to the one shown in FIG. 2B is supplied to the second extension block 421. The second extension block 421 multiplies each of 8 M-D vector derived from 8 columns of horizontally extended processing block with corresponding extension matrices provided from the extension matrix memory 430 in a substantially similar manner as that of the first extension block 420.

The extended processing block from the second extension block 421 is provided to the second encoding channel 500 shown in FIG. 4 and encoded therein.

Meanwhile, in case the linear interpolation method is used in converting the processing block to the extended processing block, the extension matrix memory 430 is not necessary. In addition, instead of matrix multiplication, the first and the second extension blocks 420 and 421 perform a 1-D linear interpolation on an M-D vector derived from each row or each column of the processing block as shown in FIG. 3 to form an N-D vector. Besides that, the overall function of the E-I device shown in FIG. 5 is similar to the one which is explained above in accordance with the optimal E-I method.

While the present invention has been described with respect to the particular embodiments, it will be apparent to those skilled in the art that various changes and modifications may be made without departing from the spirit and scope of the invention as defined in the following claims.

What is claimed is:

1. A method for converting a processing block included in an image frame signal having an object to an extended processing block, wherein the processing block consists of N×N pixels which are classified into object pixels and background pixels, N being a positive integer, the object pixels being located within the object and the background pixels being located outside the object, comprising the steps of:

(A) deciding either a horizontal or a vertical extension which has a priority based on a shape of the object pixels in the processing block;

(B) in case the horizontal extension has the priority, selecting a plurality of object rows, each of the object rows being a row of the processing block having at least one object pixels, and for each of the object rows, providing a first vector, each element of the first vector being a value of each object pixel included in said each object row, and in case the vertical extension has the priority, selecting a plurality of object columns, each of the object columns being a column of the processing block having at least one object pixels, and for each of the object columns, providing a first vector, each element of the first vector being a value of each object pixel included in said each object column, to thereby provide L first vectors, L being an integer ranging from 0 to N and denoting a number of object rows or object columns;

(C) for each of the first vectors, selecting an extension matrix among a multiplicity of predetermined extension matrices, based on a number of elements in said each first vector and N, and multiplying the selected extension matrix to said each first vector, to thereby provide L extended first vectors, each of the L extended first vectors having N elements;

(D) in case the horizontal extension has the priority, providing a first extended processing block consisting of L rows, each row having N pixels whose values are elements of each of the extended first vectors and, for each column of the first extended processing block, providing an L-dimensional second vector, elements of the second vector being values of pixels included in said each column of the first extended block, and in case the vertical extension has the priority, providing a first extended processing block including L columns, each column having N pixels whose values are elements of each of the extended first vectors and, for each row of the first extended processing block, providing an L-dimensional second vector, elements of the second vector being values of pixels included in said each row of the first extended block;

(E) selecting an extension matrix among a multiplicity of the predetermined extension matrices based on the L and N values;

(F) multiplying the extension matrix selected at step (E) to each of the second vectors, to thereby provide N extended second vectors, each of the N extended second vectors having N elements; and (G) in case the horizontal extension has the priority, providing the extended processing block including N columns, each column having N pixels whose values are elements of each of the extended second vectors, and in case the vertical extension has the priority, providing the extended processing block including N rows, each row having N pixels whose values are elements of each of the extended second vectors.

2. The method of claim 1, wherein the extension matrix for converting an M-dimensional vector, M being an integer ranging from 1 to N, to an N-dimensional extended vector is determined as $$\begin{pmatrix} a_{00} & a_{01} & \cdots & a_{0(M-1)} & \cdots & a_{0(N-1)} \\ a_{10} & a_{11} & \cdots & a_{1(M-1)} & \cdots & a_{1(N-1)} \\ \cdot & \cdot & \cdot & \cdot & \cdot & \cdot \\ \cdot & \cdot & \cdot & \cdot & \cdot & \cdot \\ \cdot & \cdot & \cdot & \cdot & \cdot & \cdot \\ a_{(M-1)0} & a_{(M-1)1} & \cdots & a_{(M-1)(M-1)} & \cdots & a_{(M-1)(N-1)} \\ \cdot & \cdot & \cdot & \cdot & \cdot & \cdot \\ \cdot & \cdot & \cdot & \cdot & \cdot & \cdot \\ \cdot & \cdot & \cdot & \cdot & \cdot & \cdot \\ a_{(N-1)0} & a_{(N-1)1} & \cdots & a_{(N-1)(M-1)} & \cdots & a_{(N-1)(N-1)} \end{pmatrix}^{-1}$$

$$\begin{pmatrix} \mu_0 b_{00} & \mu_0 b_{01} & \cdots & \mu_0 b_{0(M-1)} \\ b_{10} & b_{11} & \cdots & b_{1(M-1)} \\ \cdot & \cdot & \cdot & \cdot \\ \cdot & \cdot & \cdot & \cdot \\ \cdot & \cdot & \cdot & \cdot \\ b_{(M-1)0} & b_{(M-1)1} & \cdots & b_{(M-1)(M-1)} \\ 0 & 0 & \cdots & 0 \\ \cdot & \cdot & \cdot & \cdot \\ \cdot & \cdot & \cdot & \cdot \\ \cdot & \cdot & \cdot & \cdot \\ 0 & 0 & \cdots & 0 \end{pmatrix}$$

wherein $b_{ij}$ is represented as $$\sqrt{\frac{1}{M}} \qquad \text{for } i = 0$$

$$\sqrt{\frac{2}{M}} \cos\left[\frac{\pi(2j+1)i}{2M}\right] \quad \text{for } i \neq 0,$$

$a_{ij}$ is represented as $$\sqrt{\frac{1}{N}} \qquad \text{for } i = 0$$

$$\sqrt{\frac{2}{N}} \cos\left[\frac{\pi(2j+1)i}{2N}\right] \quad \text{for } i \neq 0$$

and $\mu_0$ is given as $$\mu_0 = \sqrt{\frac{N}{M}},$$

respectively.

3. A method for converting a processing block included in an image frame signal having an object to an extended processing block, wherein the processing block consisting of N×N pixels which are classified into object pixels and background pixels, N being a positive integer, the object pixels being located within the object and the background pixels being located outside the object, comprises the steps of:

(A) deciding either a horizontal or a vertical extension which has a priority based on a shape of the object pixels in the processing block;

(B) in case the horizontal extension has the priority, selecting a plurality of object rows, each of the object rows being a row of the processing block having at least one object pixels, and for each of the object rows, providing a first vector, each element of the first vector being a value of each object pixel included in said each object row, and in case the vertical extension has the priority, selecting a plurality of object columns, each of the object columns being a column of the processing block having at least one object pixels, and for each of the object columns, providing a first vector, each element of the first vector being a value of each object pixel included in said each object column, to thereby provide L first vectors, L being an integer ranging from 0 to N and denoting a number of object rows or columns;

(C) converting each of the first vectors to an extended first vector by using a linear interpolation, to thereby provide L extended first vectors, each of the L extended first vectors having N elements;

(D) in case the horizontal extension has the priority, providing a first extended processing block including L rows, each row having N pixels whose values are elements of each of the extended first vector and, for each column of the first extended processing block, providing an L-dimensional second vector, elements of the second vector being values of pixels included in said each column of the first extended block, and in case the vertical extension has the priority, providing a first extended processing block including L columns, each column having N pixels whose values are elements of each of the extended first vectors and, for each row of the first extended processing block, providing an L-dimensional second vector, elements of the second vector being values of pixels included in said each row of the first extended block;

(E) converting each of the second vectors to an extended second vector by using a linear interpolation, to thereby provide N extended second vectors, each of the N extended second vectors having N elements; and (F) in case the horizontal extension has the priority, providing the extended processing block including N columns, each column having N pixels whose values are elements of each of the extended second vectors, and in case the vertical extension has the priority, providing the extended processing block including N rows, each row having N pixels whose values are elements of each of the extended second vectors.

4. A method for converting a processing block included in an image frame signal having an object to an extended processing block, wherein the processing block consisting of N×N pixels which are classified into object pixels and background pixels, N being a positive integer, the object pixels being located within the object and the background pixels being located outside the object, comprises the steps of:

(A) selecting L rows of the processing block, each of the L rows having at least one object pixels, L being an integer ranging from 0 to N;

(B) for each row selected at step (A), determining M representing a number of object pixels included in said each row and providing a first vector, each element of the first vector being a value of each of the M object pixels, M being an integer ranging from 1 to N;

(C) for each first vector, selecting an extension matrix among a multiplicity of predetermined extension matrices, based on the M and N values and multiplying the selected extension matrix to the first vector to provide an extended first vector;

(D) providing a first extended processing block which includes L rows, each row having N pixels whose values are elements of each of the extended first vectors;

(E) for each column of the first extended processing block, providing an L-dimensional second vector, elements of the second vector being values of pixels included in said each column of the first extended processing block;

(F) selecting an extension matrix among a multiplicity of the predetermined extension matrices based on the L and N values; and (G) multiplying the extension matrix selected at step (F) to each of the second vectors, to provide N extended second vectors and to thereby provide the extended processing block which includes N columns, each column having N pixels whose values are elements of each of the extended second vectors.

5. The method of claim 4, wherein the extension matrix for converting an M-dimensional vector to an N-dimensional vector is determined as $$\begin{pmatrix} a_{00} & a_{01} & \cdots & a_{0(M-1)} & \cdots & a_{0(N-1)} \\ a_{10} & a_{11} & \cdots & a_{1(M-1)} & \cdots & a_{1(N-1)} \\ \cdot & \cdot & \cdot & \cdot & \cdot & \cdot \\ \cdot & \cdot & \cdot & \cdot & \cdot & \cdot \\ \cdot & \cdot & \cdot & \cdot & \cdot & \cdot \\ a_{(M-1)0} & a_{(M-1)1} & \cdots & a_{(M-1)(M-1)} & \cdots & a_{(M-1)(N-1)} \\ \cdot & \cdot & \cdot & \cdot & \cdot & \cdot \\ \cdot & \cdot & \cdot & \cdot & \cdot & \cdot \\ \cdot & \cdot & \cdot & \cdot & \cdot & \cdot \\ a_{(N-1)0} & a_{(N-1)1} & \cdots & a_{(N-1)(M-1)} & \cdots & a_{(N-1)(N-1)} \end{pmatrix}^{-1}$$

$$\begin{pmatrix} \mu_0 b_{00} & \mu_0 b_{01} & \cdots & \mu_0 b_{0(M-1)} \\ b_{10} & b_{11} & \cdots & b_{1(M-1)} \\ \cdot & \cdot & \cdot & \cdot \\ \cdot & \cdot & \cdot & \cdot \\ \cdot & \cdot & \cdot & \cdot \\ b_{(M-1)0} & b_{(M-1)1} & \cdots & b_{(M-1)(M-1)} \\ 0 & 0 & \cdots & 0 \\ \cdot & \cdot & \cdot & \cdot \\ \cdot & \cdot & \cdot & \cdot \\ \cdot & \cdot & \cdot & \cdot \\ 0 & 0 & \cdots & 0 \end{pmatrix}$$

wherein $b_{ij}$ is represented as $$\sqrt{\frac{1}{M}} \quad \text{for } i = 0$$

$$\sqrt{\frac{2}{M}} \cos\left[\frac{\pi(2j+1)i}{2M}\right] \quad \text{for } i \neq 0,$$

$a_{ij}$ is represented as $$\sqrt{\frac{1}{N}} \quad \text{for } i = 0$$

$$\sqrt{\frac{2}{N}} \cos\left[\frac{\pi(2j+1)i}{2N}\right] \quad \text{for } i \neq 0$$

and $\mu_0$ is given as $$\mu_0 = \sqrt{\frac{N}{M}},$$

respectively.

6. An apparatus for encoding an image frame signal having an object, wherein the image frame signal consists of object pixels and background pixels, the object pixels being located within the object and the background pixels being located outside the object, said apparatus including:

(A) means for detecting a boundary of the object included in the image frame to generate a contour signal providing boundary information for tracing the object boundary;

(B) means for encoding the contour signal to generate a first encoded image frame signal;

(C) means for dividing the image frame into a plurality of processing blocks, each of the processing blocks having N ×N pixels, N being a positive integer;

(D) means for generating a control signal indicating whether or not a part of the object boundary exists in each of the processing blocks;

(E) means for dividing the processing blocks to a first and a second sets of processing blocks in response to the control signal, wherein a part of the object boundary exists in each of the processing blocks of the first set;

(F) means for converting each processing block of the first set to an extended processing block;

(G) means for encoding the extended processing blocks or the second set of processing blocks, to thereby produce a second encoded image frame signal; and (H) means for formatting the first and the second encoded image signals, wherein said means for converting comprises:

(F1) means for deciding either a horizontal or a vertical extension which has a priority based on a shape of the object pixels in each processing block of the first set;

(F2) means, in case the horizontal extension has the priority, for selecting a plurality of object rows, each of the object rows being a row of the processing block having at least one object pixels, and for each of the object rows, providing a first vector, each element of the first vector being a value of each object pixel included in said each object row, and in case the vertical extension has the priority, for selecting a plurality of object columns, each of the object columns being a column of the processing block having at least one object pixels, and for each of the object columns, providing a first vector, each element of the first vector being a value of each object pixel included in said each object column, to thereby provide L first vectors, L being an integer ranging from 0 to N and denoting a number of object rows or object columns;

(F3) means, for each first vector, for selecting an extension matrix among a multiplicity of predetermined extension matrices, based on a number of elements in said first vector and N, and multiplying the selected extension matrix to said each first vector, to thereby provide L extended first vectors, each of the L extended first vectors having N elements;

(F4) means, in case the horizontal extension has the priority, for providing a first extended processing block including L rows, each row having N pixels whose values are elements of each of the extended first vectors and, for each column of the first extended processing block, for providing an L-dimensional second vector, elements of the second vector being values of pixels included in said each column of the first extended block, and in case the vertical extension has the priority, for providing a first extended processing block including L columns, each column having N pixels whose values are elements of each of the extended first vectors, and, for each row of the first extended processing block, for providing an L-dimensional second vector, elements of the second vector being values of pixels included in said each row of the first extended block;

(F5) means for choosing an extension matrix among a multiplicity of the predetermined extension matrices based on the L and the N values;

(F6) means for multiplying the extension matrix chosen at means for choosing, to each of the second vectors, to thereby provide N extended second vectors, each of the N extended second vectors having N elements; and (F7) means, in case the horizontal extension has the priority, for providing the extended processing block including N columns, each column having N pixels whose values are elements of each of the extended second vectors, and in case the vertical extension has the priority, for providing the extended processing block including N rows, each row having N pixels whose values are elements of each of the extended second vectors.

7. The apparatus of claim 6, wherein the extension matrix for converting an M-dimensional vector, M being an integer ranging from 1 to N, to an N-dimensional vector is determined as $$\begin{pmatrix} a_{00} & a_{01} & \cdots & a_{0(M-1)} & \cdots & a_{0(N-1)} \\ a_{10} & a_{11} & \cdots & a_{1(M-1)} & \cdots & a_{1(N-1)} \\ \cdot & \cdot & \cdot & \cdot & \cdot & \cdot \\ \cdot & \cdot & \cdot & \cdot & \cdot & \cdot \\ \cdot & \cdot & \cdot & \cdot & \cdot & \cdot \\ a_{(M-1)0} & a_{(M-1)1} & \cdots & a_{(M-1)(M-1)} & \cdots & a_{(M-1)(N-1)} \\ \cdot & \cdot & \cdot & \cdot & \cdot & \cdot \\ \cdot & \cdot & \cdot & \cdot & \cdot & \cdot \\ \cdot & \cdot & \cdot & \cdot & \cdot & \cdot \\ a_{(N-1)0} & a_{(N-1)1} & \cdots & a_{(N-1)(M-1)} & \cdots & a_{(N-1)(N-1)} \end{pmatrix}^{-1}$$

$$\begin{pmatrix} \mu_0 b_{00} & \mu_0 b_{01} & \cdots & \mu_0 b_{0(M-1)} \\ b_{10} & b_{11} & \cdots & b_{1(M-1)} \\ \cdot & \cdot & \cdot & \cdot \\ \cdot & \cdot & \cdot & \cdot \\ \cdot & \cdot & \cdot & \cdot \\ b_{(M-1)0} & b_{(M-1)1} & \cdots & b_{(M-1)(M-1)} \\ 0 & 0 & \cdots & 0 \\ \cdot & \cdot & \cdot & \cdot \\ \cdot & \cdot & \cdot & \cdot \\ \cdot & \cdot & \cdot & \cdot \\ 0 & 0 & \cdots & 0 \end{pmatrix}$$

wherein $b_{ij}$ is represented as $$\sqrt{\frac{1}{M}} \quad \text{for } i=0$$

$$\sqrt{\frac{2}{M}} \cos\left[\frac{\pi(2j+1)i}{2M}\right] \quad \text{for } i \neq 0,$$

$a_{ij}$ is represented as $$\sqrt{\frac{1}{N}} \quad \text{for } i=0$$

$$\sqrt{\frac{2}{N}} \cos\left[\frac{\pi(2j+1)i}{2N}\right] \quad \text{for } i \neq 0$$

and $\mu_0$ is given as $$\mu_0 = \sqrt{\frac{N}{M}},$$

respectively.

* * * * *